US008620039B2

(12) United States Patent
Burke (10) Patent No.: US 8,620,039 B2
(45) Date of Patent: Dec. 31, 2013

(54) CARD DEVICE SECURITY USING BIOMETRICS

(75) Inventor: Christopher John Burke, Ramsgate (AU)

(73) Assignee: Securicom (NSW) Pty Ltd, New South Wales (AU)

( * ) Notice: Subject to any disclaimer, the term of this patent is extended or adjusted under 35 U.S.C. 154(b) by 912 days.

(21) Appl. No.: 12/063,650

(22) PCT Filed: Aug. 10, 2006

(86) PCT No.: PCT/AU2006/001136
§ 371 (c)(1),
(2), (4) Date: Aug. 12, 2010

(87) PCT Pub. No.: WO2007/019605
PCT Pub. Date: Feb. 22, 2007

(65) Prior Publication Data
US 2010/0296708 A1    Nov. 25, 2010

(30) Foreign Application Priority Data
Aug. 12, 2005   (AU) .............................. 2005904375

(51) Int. Cl.
*G06K 9/00*    (2006.01)
(52) U.S. Cl.
USPC ........................................ 382/119; 340/5.82
(58) Field of Classification Search
USPC .................... 382/115, 119, 155, 159; 356/71; 350/5.2, 5.52, 5.53, 5.8, 5.81, 5.82, 350/5.83; 235/380, 382; 340/5.2, 5.52, 340/5.53, 5.8, 5.81, 5.82, 5.83
See application file for complete search history.

(56) References Cited

U.S. PATENT DOCUMENTS

| 5,457,747 A | 10/1995 | Drexler et al. ................... 380/24 |
| 6,665,601 B1 | 12/2003 | Nielsen .......................... 701/50 |
| 6,796,492 B1 | 9/2004 | Gatto ............................ 235/379 |
| 2004/0041690 A1 | 3/2004 | Yamagishi ........................ 340/5 |

FOREIGN PATENT DOCUMENTS

| CA | 2 412 403 A1 | 5/2003 |
| WO | WO 03/036861 A1 | 5/2003 |
| WO | WO 2004/100053 A1 | 11/2004 |

OTHER PUBLICATIONS

International Search Report dated Oct. 20, 2006.
International Preliminary Report on Patentability dated Nov. 19, 2007.
Supplementary European Search Report dated Aug. 29, 2011 for EPO Application No. EP 06760981.8.

*Primary Examiner* — Andrew W Johns
(74) *Attorney, Agent, or Firm* — Brinks Gilson & Lione (57) ABSTRACT

The disclosed Biometric Card Pointer arrangements store (207) a card user's biometric signature in a local memory (124) in a verification station (127) the first time the card user uses the verification station (127) in question. The biometric signature is stored at a memory address (607) defined by the card information (605) on the user's card (601). All future uses of the particular verification station (127) by someone submitting the aforementioned card (601) requires the card user to submit both the card and a biometric signature, which is verified against the signature stored at the memory address defined by the card information (605) thereby determining if the person submitting the card is authorized to do so.

20 Claims, 7 Drawing Sheets

CARD DEVICE SECURITY USING BIOMETRICS

This application is the National Stage of International Application No. PCT/AU2006/001136, filed Aug. 10, 2006, which claims the benefit of priority to Australian Patent Application No. 2005904375, filed on Aug. 12, 2005. All of the foregoing applications are hereby incorporated herein in their entirety in this application.

FIELD OF THE INVENTION

The present invention relates generally to security issues and, in particular, to security issues associated with use of card devices such as credit cards, smart cards, and wireless card-equivalents such as wireless transmitting fobs.

BACKGROUND

This description makes reference to various types of "card device" and their associated "reader devices" (respectively referred to merely as cards and readers). The card devices all contain card information that is accessed by "coupling" the card device to an associated reader device. The card information is used for various secure access purposes including drawing cash from an Automatic Teller Machine (ATM), making a purchase on credit, updating a loyalty point account and so on. The card information is typically accessed from the card by a corresponding card reader which then sends the card information to a "back-end" system that completes the appropriate transaction or process.

Figure 1:
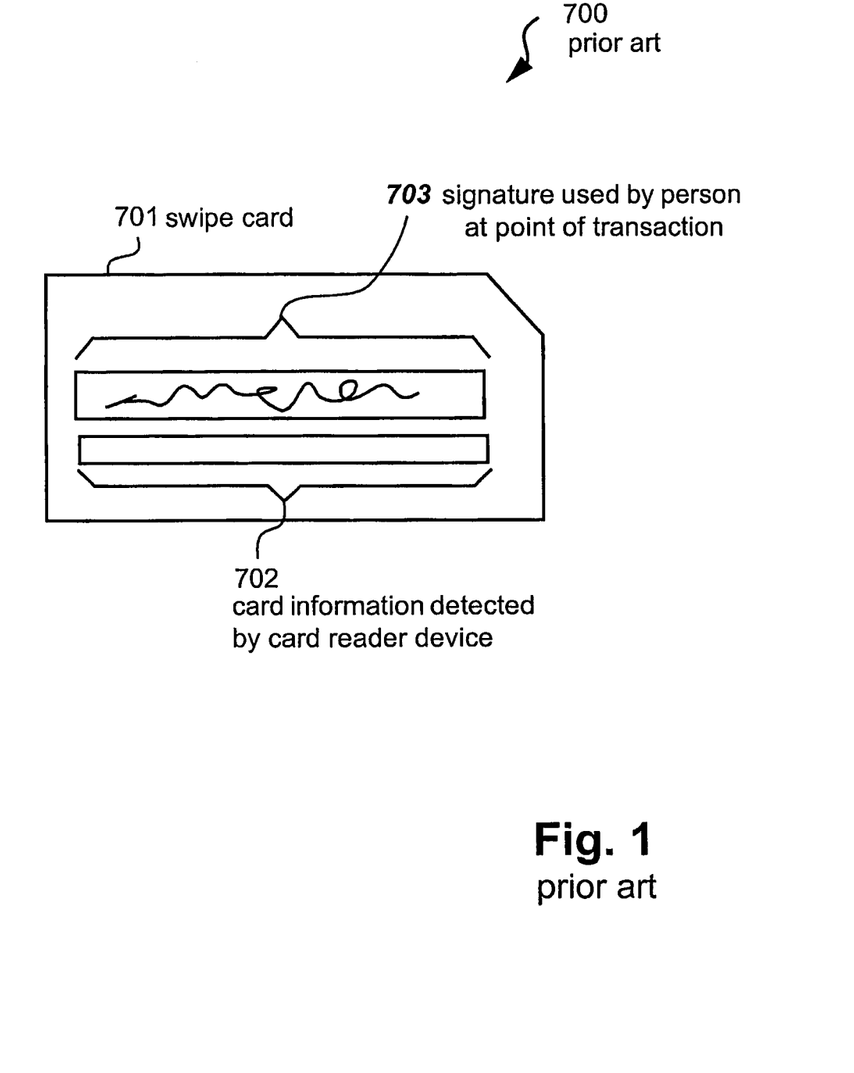
FIG. 1 depicts a standard credit card.

One type of card is the "standard credit card" which in this description refers to a traditional plastic card 701 as depicted in FIG. 1. The standard credit card is typically "swiped" through a slot in a standard credit card reader in order to access card information 702 on the card 701. The card information 702 can alternately be encoded using an optical code such as a bar code, in which case the reader is suitably adapted. The standard credit card 701 also typically has the signature 703 of the card-owner written onto a paper strip on the card 701. This is used for verification of the identity of the person submitting the card when conducting a transaction using the card 701.

Another type of card device is the smart card (not shown) that typically has an on-board processor and a memory. The smart card typically has electrical contacts that mate with corresponding contacts on a smart card reader (not shown) when accessing data in the memory of the smart card.

Another type of card device is the wireless "key-fob" which is a small radio transmitter that emits a radio frequency (RF) signal when a button on the fob is pressed. The RF signal can be encoded using the Wiegand protocol, or any other suitable protocol, such as rolling code or Bluetooth™ and can include encryption if desired. The key-fob typically has a processor and memory storing data that is sent via the transmitted signal to a corresponding receiver, which is the "reader device" for this type of card device.

The description also refers to "card user" and "card owner". The card user is the person who submits the card for a particular transaction. The card user can thus be the (authorised) card owner or an (unauthorised) person who has found or stolen the card.

Clearly the signature 703 on the standard credit card 701 in FIG. 1 can be forged. Thus, if the standard card 701 is stolen or lost, an unauthorised user can use the card provided that they can supply a sufficiently accurate version of the signature 703. The only recourse available to the card owner is to notify the card issuing company to "cancel" the card.

Current card devices such as the standard credit card, the smart card and the key-fob can have their security enhanced by requiring the card user to provide PIN (Personal Identification Number) information through a keypad to verify their identity prior to completing a transaction. However, PIN information can also be "stolen" by surveillance of the card owner's hands as the card owner operates the keypad.

Figure 2:
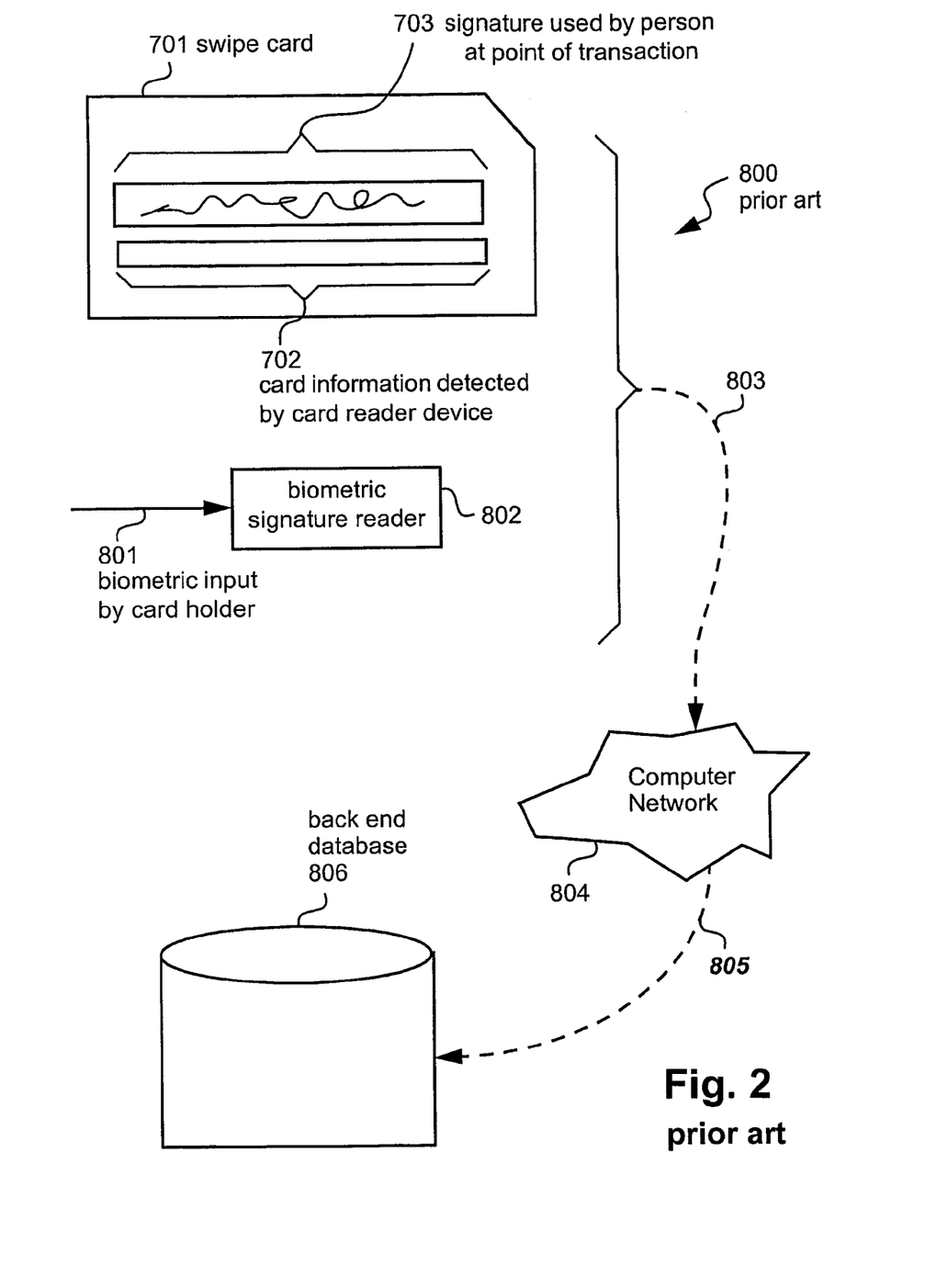
FIG. 2 shows the card of FIG. 1 being used together with biometric verification.

Biometric verification can also be incorporated into current card systems to enhance security. In FIG. 2 the card user swipes the standard card 701 through an associated card reader (not shown) that accesses the card information 702 on the card 701. The card user also provides a biometric input 801, for example by pressing their thumb against a biometric (eg fingerprint) reader 802. The card information 702 that is read by the card reader (not shown), together with the biometric signature that is read by the biometric (fingerprint) reader 802, are sent, as depicted by a dashed arrow 803, a computer network 804, and a further dashed arrow 805, to a back-end system including a database 806 and associated processor (not shown).

In this arrangement, the card owner needs to have previously registered their biometric signature 801 and the card information 702 for pre-loading onto the back-end database 806. Having done so, the back-end processor (not shown) compares the pre-loaded information on the database 806 with the information received at 805, in order to check that the card holder of the card 701 is the (authorised) card owner and that the card itself is valid, in which case the transaction in question can proceed. Clearly this arrangement requires a central repository (806) of card information 702 and biometric information 801. This is cumbersome and potentially compromises the privacy of the holder of the card 701. This arrangement also requires complex back-end database management and the communications network 804. Furthermore, the front-end biometric signature reader 802 requires storage and/or processing capabilities for the biometric signatures. This results in a complex and expensive solution.

Privacy concerns have also been raised against the arrangement of FIG. 2 which involves centralised storage and processing of personal information including biometric information. These concerns have slowed widespread use of biometrics to enhance user verification.

SUMMARY

It is an object of the present invention to substantially overcome, or at least ameliorate, one or more disadvantages of existing arrangements.

Disclosed are arrangements, referred to as Biometric Card Pointer (BCP) arrangements or systems, which seek to address the above problems relating to secure access and/or secure processes, by automatically storing a card user's biometric signature in a local memory in a verification station comprising a card reader, a biometric signature reader, the local biometric signature memory (preferably in a mechanically and electronically tamper-proof form), an alphanumeric keypad (optional), and a communication module for communicating with back-end system that may be remotely accessible over a network.

The card user's biometric signature is automatically stored the first time the card user uses the verification station in question (this being referred to as the enrolment phase). The biometric signature is stored at a memory address defined by the ("unique") card information on the user's card as read by the card reader of the verification station. Clearly the term "unique" means unique in the context of a permitted set of cards associated with the verification station. This is described in more detail in regard to FIG. 8.

All future uses (referred to as uses in the verification phase) of the particular verification station by someone submitting the aforementioned card requires the card user to submit both the card to the card reader and a biometric signature to the biometric reader, which is verified against the signature stored at the memory address defined by the card information thereby determining if the person submitting the card is authorised to do so.

Each use of the verification station is identical from the card user's perspective, requiring merely input of the card to the card reader, and provision of the biometric signature (eg thumb print or retinal scan etc.) to the biometric reader.

An authorised card user will be automatically verified by the BCP arrangement in the verification station, and the corresponding transaction, be it an ATM cash withdrawal, a credit purchase, a loyalty point update etc. will simply proceed as normal. An unauthorised card user (ie a card user who misappropriated the card after the initial enrolment) will not receive authorisation, and the intended transaction will not proceed. Furthermore, the biometric signature of the unauthorised user will be captured in the verification station, and can be used by the authorities to track the unauthorised user and prove misappropriation of the card.

The disclosed BCP arrangements require little if any modification of the back-end systems or the (front-end) card. The additional administrative overheads associated with the BCP arrangements, above those already required for systems using (standard) cards and back-end systems, are minimal. The BCP arrangements also potentially have a reduced impact on privacy of card users. The biometric signatures stored in the local database of the verification station can be made off limits to anyone, or limited to law enforcement agencies, depending on the administrative environment in which the BCP arrangements are implemented. Users of current card systems can learn to use BCP arrangements without much effort, needing only to provide a biometric signature when asked to do so at the verification station. The difference between the enrolment and verification phases are transparent to users, further reducing the effort in learning how to use the BCP arrangements.

According to a first aspect of the present invention, there is provided a method of enrolling in a biometric card pointer system, the method comprising the steps of:
  receiving card information;
  receiving the biometric signature; and
  storing, if a memory location defined by the card information is unoccupied, the biometric signature at the defined memory location.

According to another aspect of the present invention, there is provided a method of obtaining verified access to a process, the method comprising the steps of:
  storing a biometric signature according to the noted enrolment method;
  subsequently presenting card information and a biometric signature; and
  verifying the subsequently presented presentation of the card information and the biometric signature if the subsequently presented biometric signature matches the biometric signature at the memory location defined by the subsequently presented card information.

According to another aspect of the present invention, there is provided a method of securing a process at a verification station, the method comprising the steps of:

(a) providing card information from a card device to a card reader in the verification station;
(b) inputting a biometric signature of a user of the card device to a biometric reader in the verification station;
(c) determining if the provided card information has been previously provided to the verification station;
(d) if the provided card information has not been previously provided to the verification station;
  (da) storing the inputted biometric signature in a memory at a memory location defined by the provided card information; and
  (db) performing the process dependent upon the received card information;
(e) if the provided card information has been previously provided to the verification station;
  (ea) comparing the inputted biometric signature to the biometric signature stored in the memory at the memory location defined by the provided card information;
  (eb) if the inputted biometric signature matches the stored biometric signature, performing the process dependent upon the received card information; and
  (ec) if the inputted biometric signature does not match the stored biometric signature, not performing the process dependent upon the received card information.

According to another aspect of the present invention, there is provided a verification station for securing a process, the verification station comprising:
  a card device reader for receiving card information from a card device coupled to the verification station;
  a biometric signature reader for receiving a biometric signature provided to the verification station;
  means for determining if the provided card information has been previously provided to the verification station;
  means, if the provided card information has not been previously provided to the verification station, for;
    storing the inputted biometric signature in a memory at a memory location defined by the provided card information; and
    performing the process dependent upon the received card information;
  means, if the provided card information has been previously provided to the verification station, for;
    comparing the inputted biometric signature to the biometric signature stored in the memory at the memory location defined by the provided card information;
    if the inputted biometric signature matches the stored biometric signature, performing the process dependent upon the received card information; and
    if the inputted biometric signature does not match the stored biometric signature, not performing the process dependent upon the received card information.

According to another aspect of the present invention, there is provided a computer program product including a computer readable medium having recorded thereon a computer program for directing a processor to execute a method for securing a process at a verification station, said program comprising:
  code for determining if card information, provided to a card device reader incorporated into the verification station, has been previously provided to the verification station;
  code, if the provided card information has not been previously provided to the verification station, for;
    storing a biometric signature, inputted to a biometric signature reader incorporated into the verification station, in a memory incorporated into the verification station, at a memory location defined by the provided card information; and performing the process dependent upon the received card information;

code, if the provided card information has been previously provided to the verification station, for;

comparing the inputted biometric signature to the biometric signature stored in the memory at the memory location defined by the provided card information;

if the inputted biometric signature matches the stored biometric signature, performing the process dependent upon the received card information; and if the inputted biometric signature does not match the stored biometric signature, not performing the process dependent upon the received card information.

According to another aspect of the present invention, there is provided a computer program product including a computer readable medium having recorded thereon a computer program for directing a processor to execute a method of enrolling in a biometric card pointer system, the program comprising:

code for receiving card information;

code for receiving the biometric signature; and code for storing, if a memory location defined by the card information is unoccupied, the biometric signature at the defined memory location.

According to another aspect of the present invention, there is provided a computer program product including a computer readable medium having recorded thereon a computer program for directing a processor to execute a method of obtaining verified access to a process, the program comprising:

code for storing a biometric signature according to the noted enrolment method;

code for subsequently presenting card information and a biometric signature; and code for verifying the subsequently presented presentation of the card information and the biometric signature if the subsequently presented biometric signature matches the biometric signature at the memory location defined by the subsequently presented card information.

Other aspects of the invention are also disclosed.

BRIEF DESCRIPTION OF THE DRAWINGS

Some aspects of the prior art and one or more embodiments of the present invention will now be described with reference to the drawings, in which.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

Figure 3:
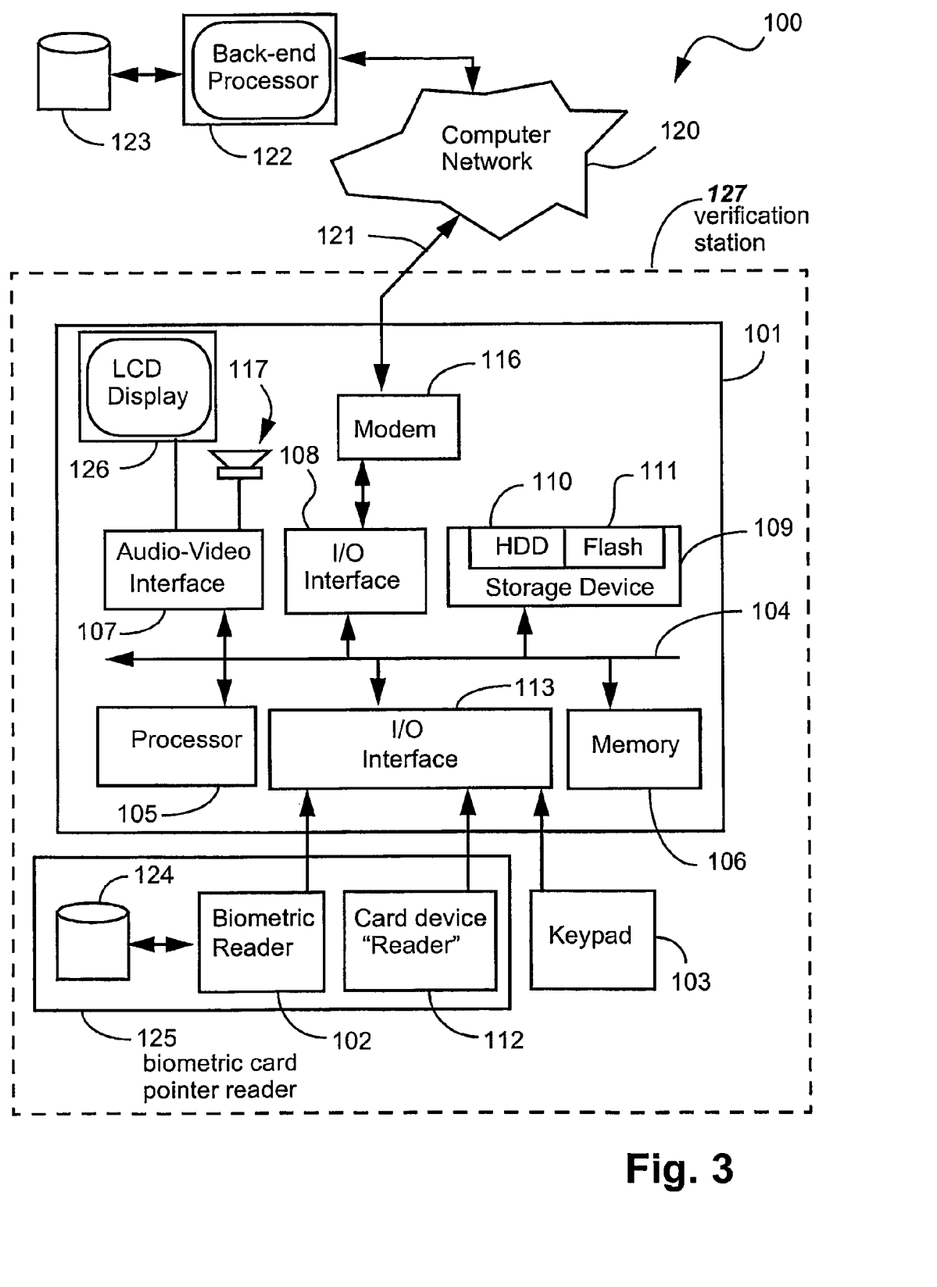
FIG. 3 is a functional block diagram of a special-purpose computer system upon which described methods for the BCP arrangements can be practiced.

FIG. 3 is a functional block diagram of a system 100 in which the disclosed BCP arrangements can be practiced. The disclosed BCP methods particularly lend themselves to implementation on the special-purpose computer system 100 such as that shown in FIG. 3 wherein the processes of FIGS. 5-8 and 9 may be implemented as software, such as a BCP application program executing within the computer system 100. In particular, the steps of the BCP processes are effected by instructions in the BCP software that are carried out by a verification station 127. The verification station 127 is typically constructed in a tamper-proof manner, both physically and electronically, to prevent unauthorised access to the inner mechanism of the verification station 127. The instructions may be formed as one or more code modules, each for performing one or more particular tasks. The BCP software may also be divided into two separate parts, in which a first part performs the BCP methods and a second part manages a user interface between the first part and the user.

The BCP software may be stored in a computer readable medium, including the storage devices described below, for example. The BCP software is loaded into the verification station 127 from the computer readable medium, and then executed by the verification station 127. A computer readable medium having such software or computer program recorded on it is a computer program product. The use of the computer program product in the computer preferably effects an advantageous apparatus for effecting the BCP arrangements.

The verification station 127 comprises, in the described arrangement, a biometric card pointer reader 125, a keypad 103, and a computer module 101. The biometric card pointer reader is made up of a biometric reader 102, a card device reader 112 and a local database 124.

The computer system 100 consists of a computer module 101, input devices such as a biometric reader 102, a card reader 112, and a keypad 103, output devices including an LCD (Liquid Crystal Display) display device 126 and a loudspeaker 117. The computer module 101 uses a Modulator-Demodulator (Modem) transceiver device 116 for communicating to and from a communications network 120, for example connectable via a telephone line 121 or other functional medium. The modem 116 can be used to obtain access to a back end system including a processor 122 and back-end database 123 over the Internet, and other network systems, such as a Local Area Network (LAN) or a Wide Area Network (WAN).

The computer module 101 typically includes at least one processor unit 105, and a memory unit 106, for example formed from semiconductor random access memory (RAM) and read only memory (ROM). The module 101 also includes a number of input/output (I/O) interfaces including an audio-video interface 107 that couples to the LCD display 126 and loudspeaker 117, an I/O interface 113 for the keypad 103, biometric reader 102 and card reader 112, and an interface 108 for the modem 116. In some implementations, the modem 1116 may be incorporated within the computer module 101, for example within the interface 108.

A storage device 109 is provided and typically includes a hard disk drive 110 and a flash memory 111. The components 105, to 111 and 113 of the computer module 101, typically communicate via an interconnected bus 104 and in a manner that results in a conventional mode of operation of the computer system 100 known to those in the relevant art.

Typically, the BCP application program is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the BCP application program may be supplied to the user encoded on the flash memory device 111, or alternatively may be read by the computer module 101 from the network 120 via the modem device 116.

Still further, the software can also be loaded into the computer system 100 from other computer readable media. The term "computer readable medium" as used herein refers to any storage or transmission medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transmission media include radio or infra-red transmission channels as well as a network connection to another computer or networked device, and the Internet or Intranets including e-mail transmissions and information recorded on Websites and the like.

Figure 4:
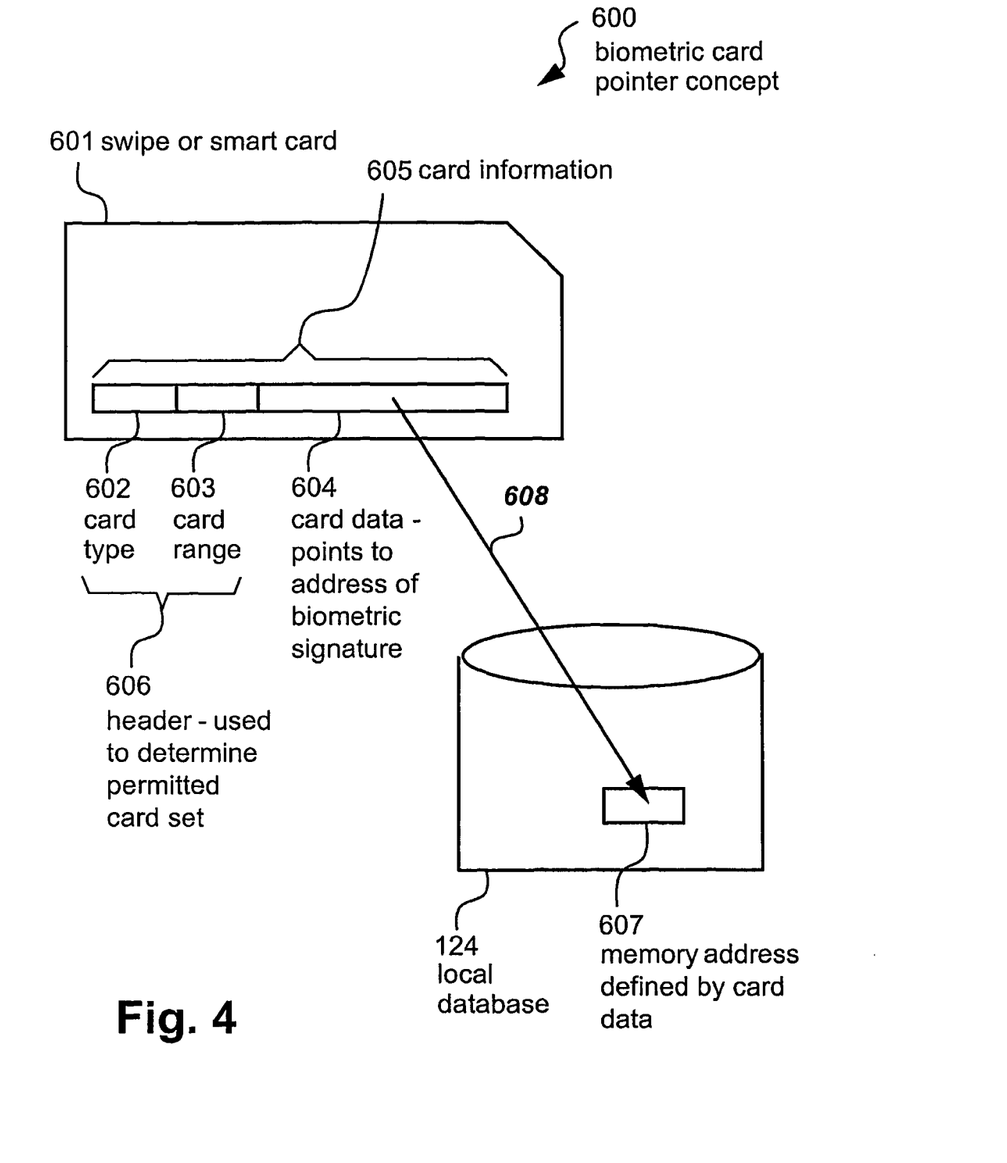
FIG. 4 illustrates the biometric card pointer concept.

As illustrated in FIG. 4, a standard card 601 has card information 605 typically comprising three fields, namely 602 which is the card type, 603 which is the card range, and 604 which comprises card data specific to the particular card 601. The card information 605 can be encoded using a magnetic strip, a bar code, or a solid state memory on the card 601. Alternately, the card device can be implemented as a wireless key fob. In one example of the disclosed BCP approach, the card data 604 acts as the memory reference which points, as depicted by an arrow 608, to a particular memory location at an address 607 in the local database 124 in the verification station 127 of FIG. 3. The fields 602 and 603, which together form a header 606, can be used by the disclosed BCP system to determine if the card 601 is to be processed according to the disclosed BCP approach or not. This is described in more detail in regard to FIG. 8. Alternately, any segment of the card information 605 can be used as the memory reference which points to the particular memory location in the local database 124.

In an initial enrolment phase, the card user couples their card 601 (or key-fob or other card device) to the card reader 112. The card user is then required to input a biometric signature, such as fingerprint, face, iris, or other unique signature, into the biometric reader 102. The card data 604 defines the location 607 in the memory 124 where their unique biometric signature is stored.

Thereafter, in later verification phases, the user couples their card 601 to the card reader 112, after which the card user is required to again present their unique biometric to the biometric reader 102. This signature is compared to the signature stored at the memory location 607 in the memory 124, the memory location 607 being defined by the card data 604 read from their card 601 by the card reader 112. Once verification is confirmed, the card information 605 is transferred from the verification station 127 to the back-end processor 122 for completion of the transaction.

Importantly, the back-end processor 122 does not see the difference between receiving the card information 605 from the verification station 127, and receiving it from a conventional card reader in the absence of the verification station implementing the disclosed BCP arrangement. This means that back-end processes (depicted by the back-end processor 122 and the back-end database 123) need no modification when incorporating the BCP arrangement into current card systems. There are additional elements in the verification station 127 (see FIG. 3) compared to the normal card reader, however this is a relatively simple an inexpensive upgrade compared to the centralised arrangement depicted in FIG. 2.

Figure 5:
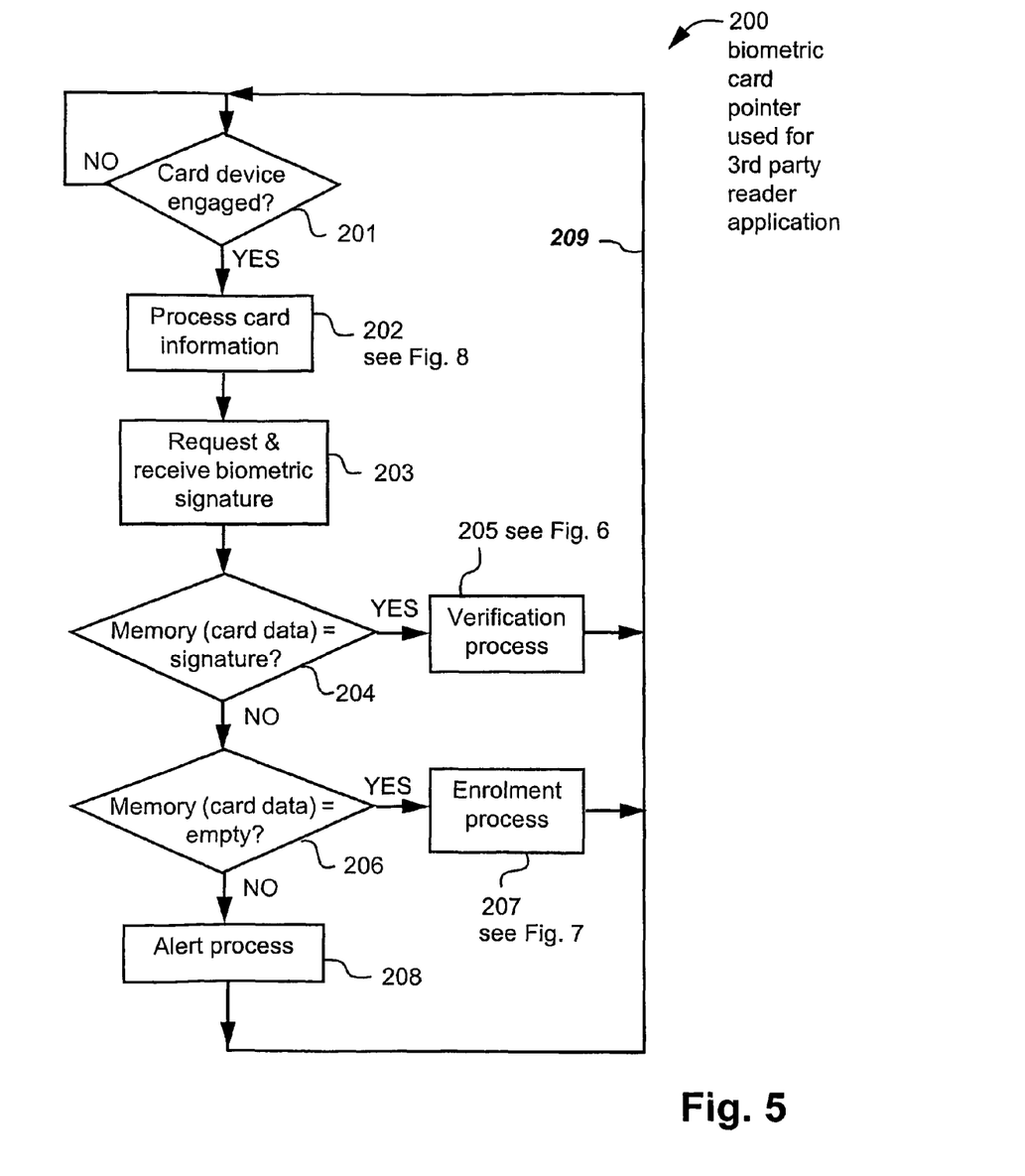
FIG. 5 is a flow chart of a process for using the biometric card pointer arrangement.

FIG. 5 shows a process 200 for normal use of the BCP approach. In a first step 201, the processor 105 determines if the card 601 has been read by the card reader 112. If this is not the case, then the process 200 follows a NO arrow back to the step 201. If, on the other hand, the card 601 has been read by the card reader 112, then the process 200 follows a YES arrow to a step 202 (see FIG. 8 for more details). In the step 202, the processor 105 processes the card information 605 that is read from the card 601 by the card reader 112. In a following step 203 a request is presented to the card holder to provide a biometric signature to the biometric reader 102. This request can be provided in an audio fashion by means of the audio interface 107 and the speaker 117, this being driven by suitable software running on the processor 105. Alternatively or in addition, a suitable message can be displayed on the LCD display 126 by suitable software running on the processor 105.

In response to the aforementioned request, the holder of the card 601 provides a biometric signature to the biometric reader 102. After the signature has been received by the step 203, the process 200 is directed to a step 204 that reads the contents of the local database 124 at an address defined by the card data 604. If the contents of this memory address match, to a sufficiently high degree of correspondence, the biometric signature received in the step 203 via the biometric reader 102, then the process follows a YES arrow to a step 205 (see FIG. 6 for more detail). It is noted that if the step 204 returns a YES value, then the biometric signature at the noted memory address was written into the memory 124 in an earlier enrolment phase. It is also noted that the step 204 reads the contents stored at a single memory address defined by the card data 604 and checks these contents against the biometric signature received in the step 203. There is no need to search the entire database 124 to see if there is a match. Thus the disclosed BCP arrangement provides a particularly simple and fast biometric verification check thereby securing the process associated with the step 205. Once the step 205 has completed the verification process, the process 200 is directed according to an arrow 209 back to the step 201.

In an alternate arrangement, the card data 604 can be associated with a group of memory locations, rather than being the address for a specific memory location. This arrangement allows a different biometric signature to be stored in each of the group of memory locations, and in this case, the step 204 reads the contents stored in each memory location in the group defined by the card data 604, and checks the contents of each memory location in the group against the biometric signature received in the step 203. If the contents of any member of the group of memory locations matches, to a sufficiently high degree of correspondence, the biometric signature received in the step 203 via the biometric reader 102, then the process follows a YES arrow to a step 205. This arrangement allows, for example, two cards having the same card data 604 to be used at the same verification station 127 after each card holder performs their own individual enrolment process.

Returning to the step 204, if the contents of the local database 124 at the memory address defined by the card data 604 does not match the signature received by the biometric reader 102, then the process 200 follows NO arrow to a step 206. In the step 206, the processor 105 determines if the contents of the memory defined by the card data 604 is empty. If this is the case, then the process 200 follows a YES arrow to a step 207 that performs an enrolment process for the card 601 (see FIG. 7 for more detail). The process 200 then follows the arrow 209 back to the step 201.

Returning to the step 206, if the contents of the aforementioned memory location is not empty, then this means that (i) the card 601 and the associated biometric signature of the card holder have previously been used for the enrolment process 207, and (ii) the biometric signature now received in the step 203 does not match the signature stored in the database 124. In this event, the process 200 follows a NO arrow to a step 208 that performs an alert process. The process 200 then follows the arrow 209 back to the step 201. The alert process 208 can include sending an alert message from the verification station 127 to the back end processor 122 for later action, for example by the police. The alert process can also store the (unauthorised) signature for later use by the law enforcement authorities, and can capture the card in the verification station 127, thereby removing the card from the possession of the apparently unauthorised person.

The alert process 208 can send, as part of the alert message, send all or part of the card information 605 that is input to the verification station 127 in the step 201 of FIG. 5.

Although in the above description the step 206 tests if the memory location defined by the card data 604 is "empty", other approaches can be used. Thus when enrolment is performed, resulting in a memory location being used to store a biometric signature (eg see step 401 in FIG. 7), a flag can be set to indicate that the memory location in question is occupied. The term "occupied" in this context means that the memory location in question has been used in the enrolment process for a user, and that the information stored at the memory location in question has not been deleted by a BCP system administrator. If the signature stored in the database 124 at the particular memory location is deleted by a BCP system administrator (as described in regard to FIG. 8) then the flag can be reset to indicate that the memory location in question is no longer occupied.

As noted in regard to FIG. 3, the verification station 127 is constructed in a tamper proof fashion to ensure that the process 200 of FIG. 5, particularly the steps 204-207, are not accessible to unauthorised tampering.

Figure 6:
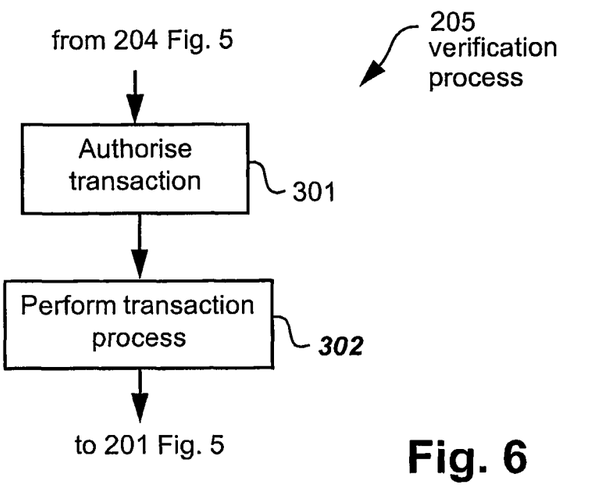
FIG. 6 shows the verification process of FIG. 5 in more detail.

FIG. 6 shows the verification process 205 from FIG. 5 in more detail. The process 205 is entered from the step 204 in FIG. 5, after which a step 301 authorises the transaction. This authorisation step 301 indicates that the biometric signal received by the biometric reader 102 in the step 203 matches the biometric signature previously stored in the local database 124 by a previous enrolment process 207 applied to the card in question.

After the step 301, a step 302 performs the transaction process (which may be viewed as a process of obtaining verified access to a protected resource), whatever that may be. Thus, for example, if the process 200 of FIG. 5 relates withdrawal of cash from an Automatic Teller Machine (ATM) operated by one of a number of service providers, then the step 302 comprises the user specifying the required amount of cash and the relevant account information via the keypad 103 (see FIG. 3), and the provision of a receipt and cash by the ATM (not shown). After completion of the transaction process by to the step 302, the process 205 is directed back to the step 201 in FIG. 5.

Figure 7:
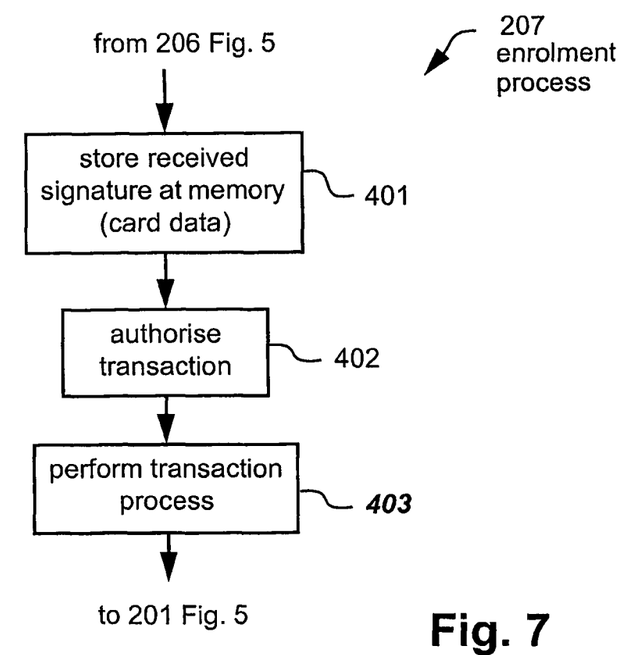
FIG. 7 shows the enrolment process of FIG. 5 in more detail.

FIG. 7 shows the enrolment process step 207 from FIG. 5 in more detail. The process 207 is entered from the step 206 in FIG. 5, after which a step 401 stores the biometric signature received by the step 203 in the memory 124 at a memory address defined by the card data 604 received in the step 202 of FIG. 5. The aforementioned step 401 can store the biometric signature in encrypted form to reduce the probability that the signature can be acquired for unauthorised use, thus helping ensure the privacy of the card owner. The following steps 402 and 403 have the same respective functions as the corresponding steps 301 and 302 in FIG. 6. After completion of the step 403, the process 207 is directed back to the step 201 in FIG. 5.

Figure 8:
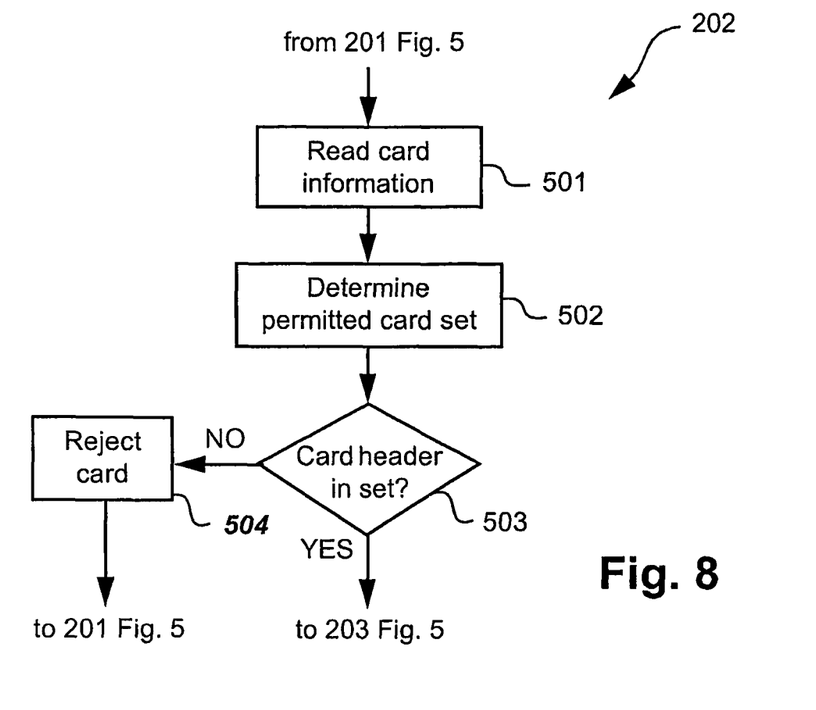
FIG. 8 shows the card information process of FIG. 5 in more detail.

FIG. 8 shows the step 202 in FIG. 5 that is concerned with the processing of the card information 605 from the card 601 when the card 601 is read by the card reader 112 in the step 202 of FIG. 5. The process 202 is entered from the step 201 in FIG. 5, after which a step 501 reads the card information 605 from the card 601 using the card reader 112. In a following step 502, the processor 105 retrieves predefined "permitted card set" parameters to determine the "permitted card set" for the verification station 127 in question. A separate, or overlapping, permitted card set is defined for each verification station 127. This ensures that a limited population of cards such as 601 undergo the BCP process at any given verification station 127. This has the advantage of ensuring that the local memory 124 does not overflow, and it also provides control over which users make use of which verification stations.

In a following step 503 the processor 105 compares the header 606 against the predefined permitted card set parameters to determine if the card 601 belongs to the set of permitted cards for the verification station 127 in question. If this is the case, then the process 202 is directed by a YES arrow to the step 203 in FIG. 5. If, on the other hand, the card header 606 does not belong to the permitted card set for the particular verification station 127, then the step 202 follows a NO arrow from the step 503 to a step 504. In the step 504, the processor 105 rejects the card that has been entered into the card reader 112. This rejection can take the form of a message displayed on the LCD display 126 and/or a corresponding audio message via the speaker 117. Thereafter, the process 202 is directed back to the step 201 in FIG. 5. It is noted that even if the verification station does not reject the card not belonging to the permitted card set for the verification station 127 in question, the back-end processor 122 can do so.

In addition to the predefined permitted card set, other administrative functions can be provided by the BCP arrangements. Thus, the predefined permitted card set details can be amended and/or the signatures stored in the database 124 can be deleted by a BCP system administrator. Audit trail information is also stored in the verification station 127 and can be downloaded for audit purposes. The audit information typically includes information of which cards have been submitted to the verification station and the time stamps of the card submissions. Biometric signatures are typically not part of the downloadable audit information, and require a greater level of authorisation (such as that associated with law enforcement agencies) for access.

Figure 9:
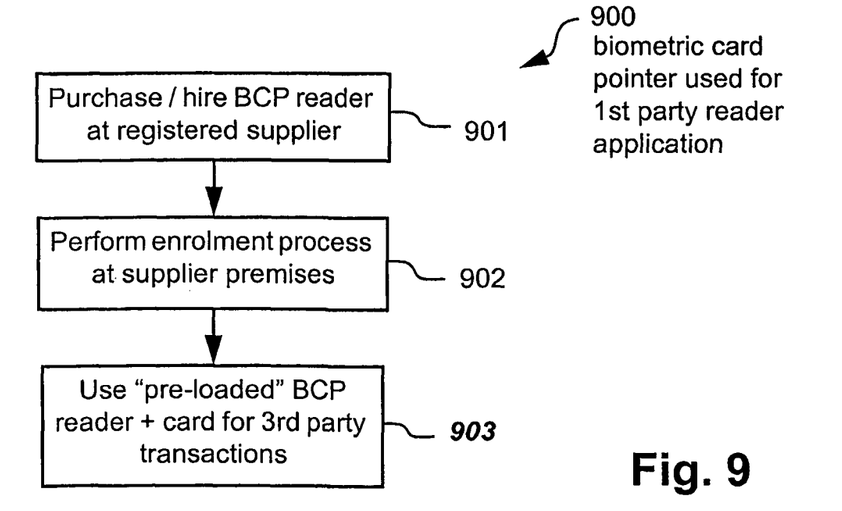
FIG. 9 shows an alternate use for the biometric card pointer arrangement.

FIG. 9 shows another application 900 to which the BCP arrangement can be applied. In a first step 901 a person purchases or hires a verification station implemented in a portable form. A step 901 is performed at a registered supplier premises. Accordingly in a following step 902, the enrolment process is performed in controlled circumstances at the supplier premises. The "controlled conditions" referred to mean that the enrolment process is performed under conditions where the identity of the holder of the card 601 is verified, using a driving licence, passport or equivalent identification document, this ensuring that the enrolment process enrols the true owner of the card in an authorised manner.

In a following step 903, the verification station together with the card 601 can be used for third party transactions. Thus, in one example, the holder of the card 601 can take the portable verification station and connect it to his or her personal computer (PC) in order to participate in an on-line casino. This type of application may require that the portable verification station be loaded with a station identification number (which can be the serial number of the portable verification station) at the registered supplier premises. This station identification number is then transmitted to the on-line casino back-end processes together with the card information 605. This type of application does require some modification of the back-end processes.

In another example, the holder of the card 601 takes the card 601 and the portable verification station 127 to a shop which does not, as yet, have a BCP installation on the premises. In this event, providing that the BCP concept is known, the holder of the card 601 is able to apply the card to the card reader 112, apply their biometric signature to the biometric reader 102, and have the verification station 127 output the corresponding card information 605. The shop assistant in this instance will, providing that they are aware of the BCP concept, know that the holder of the card 601 is the authorised owner.

INDUSTRIAL APPLICABILITY

It is apparent from the above that the arrangements described are applicable to the computer and data processing industries.

Furthermore, the disclosed biometric card pointer arrangements can be used in regard to credit cards, loyalty cards, access cards, ATM and bank or financial cards and others. The BCP arrangements can, in general be used in addition to standard cards for purposes of entry, identification, accessing details pertinent to the user, (i.e. authorisation to be in a specific location based on user data), payment purposes or associated loyalty, club membership applications, motor vehicle or specialist vehicle machinery operations and more.

Thus, for example, the BCP arrangement can be added to ATM machines, wherein the card user is required to enter their biometric signature for verification prior to entering their normal ATM PIN and withdrawing funds, thereby increasing the security of the ATM arrangement with minimal changes to the underlying platform.

Furthermore, the disclosed BCP arrangement can be used for secure access to a hotel room. When a guest registers with the hotel, the hotel issues the guest with a card containing a number defining the room number and planned departure date. After the guest enrols their biometric signature at the verification station (which includes a real time clock to match the actual time against the planned date of departure) mounted at the door of their room using the aforementioned card, the BCP arrangement will give them secure access to their room for the duration of their stay.

In addition to issuing the card, a fingerprint reader can be located at each room in the hotel. When the card is first issued, the guest uses the card to gain entry and change or update the code at the room for their exclusive use during their stay. The card reader can also allocate memory for storage of fingerprints, (any number of fingerprints can be allocated to the new card) which allows the individual and all associated guests to enrol their biometric signatures at this point. The enrolment is simply achieved, for example, by inserting the card and placing a finger on the fingerprint module, for each guest. Following this enrolment stage, the card or the finger can be used to gain access to the room; negating the requirement for guests to carry the room card, plus increasing security and convenience.

The benefit of having the card locate the fingerprints memory address is that the time and date of departure can also be added to the same memory location. Therefore, this application also allows other related data to be added to the memory location, enhancing the capability of the BCP arrangement. The ability to associate a memory location with a card number and expiry date can be related to many diverse applications, but utilises the same principle as storage of the fingerprint data.

Another application for the disclosed BCP arrangement is in regard to passport control and customs. The BCP arrangement can be installed at passport control and customs in various countries, and a person can enrol their biometric, after using their existing passport or ID card to pass through customs. The biometric signature is stored in a memory location related to the individual's passport or ID number, and retrieved for comparison as described in relation to FIG. 5.

The foregoing describes only some embodiments of the present invention, and modifications and/or changes can be made thereto without departing from the scope and spirit of the invention, the embodiments being illustrative and not restrictive.

Thus, for example, although the description has been couched in terms of fingerprint biometric signatures, other biometrics such as facial shape, iris pattern can equally be used.

The claims defining the invention are as follows:

1. A method of enrolling in a biometric card pointer system, the method comprising the steps of:
   receiving card information;
   receiving the biometric signature;
   defining, dependent upon the received card information, a memory location in a local memory external to the card;
   determining if the defined memory location is unoccupied; and
   storing, if the memory location is unoccupied, the biometric signature at the defined memory location.

2. A method of obtaining verified access to a process, the method comprising the steps of:
   storing a biometric signature according to the enrolment method of claim 1;
   subsequently presenting card information and a biometric signature; and
   verifying the subsequently presented presentation of the card information and the biometric signature if the subsequently presented biometric signature matches the biometric signature at the memory location, in said local memory, defined by the subsequently presented card information.

3. A method of securing a process at a verification station, the method comprising the steps of:
   (a) providing card information from a card device to a card reader in the verification station;
   (b) inputting a biometric signature of a user of the card device to a biometric reader in the verification station;
   (c) determining if the provided card information has been previously provided to the verification station;
   (d) if the provided card information has not been previously provided to the verification station;
      (da) storing the inputted biometric signature in a memory at a memory location defined by the provided card information; and
      (db) performing the process dependent upon the received card information;
   (e) if the provided card information has been previously provided to the verification station;

(ea) comparing the inputted biometric signature to the biometric signature stored in the memory at the memory location defined by the provided card information;

(eb) if the inputted biometric signature matches the stored biometric signature, performing the process dependent upon the received card information; and (ec) if the inputted biometric signature does not match the stored biometric signature, not performing the process dependent upon the received card information.

4. A method according to claim 3, wherein the card device is one of:
- a card in which the card information is encoded in a magnetic strip;
- a card in which the card information is encoded in a bar code;
- a smart card in which the card information is stored in a solid state memory on the smart card; and
- a key fob adapted to provide the card information by transmitting a wireless signal to the verification station.

5. A method according to claim 3, wherein:
the card information provided in the step (a) comprises a header and card data; and
the steps (c), (d) and (e) are only performed if the header indicates that the card belongs to a set of cards associated with the verification station.

6. A method according to claim 3, wherein the performance of the process in the steps (db) and (eb) comprises outputting at least part of the inputted card information from the verification station.

7. A method according to claim 6, wherein at least one of the steps (db) and (eb) comprise at least one of the further steps of:
inputting information from a keypad to the verification station; and
outputting at least some of the information input from the keypad.

8. A method according to claim 7, wherein the information outputted is communicated to one of:
a service provider for providing a service dependent upon receipt of the outputted information; and
an apparatus for providing access to a service dependent upon receipt of the outputted information.

9. A method according to any one of claims claim 6, 7 and 8 wherein the information outputted is communicated to one of:
a service provider for providing a service dependent upon receipt of the outputted information; and
an apparatus for providing access to a service dependent upon receipt of the outputted information.

10. A method according to claim 3, wherein the step (ec) further comprises outputting information indicating that the user of the card device is not authorised authorized.

11. A method according to claim 10, wherein the information outputted is communicated to one of:
a service provider for providing a service dependent upon receipt of the outputted information; and
an apparatus for providing access to a service dependent upon receipt of the outputted information.

12. A method according to claim 3, comprising the further steps of:
(f) storing the card information provided by successive instances of the step (a); and
(g) outputting the information stored in the step (f) for audit purposes.

13. A biometric card pointer enrolment system comprising:
a card device reader for receiving card information;
a biometric reader for receiving the biometric signature;
means for defining, dependent upon the received card information, a memory location in a local memory external to the card;
means for determining if the defined memory location is unoccupied; and
means for storing, if the memory location is unoccupied, the biometric signature at the defined memory location.

14. A biometric card pointer verified access system comprising:
the biometric card pointer enrolment system of claim 13; and
means for verifying (i) a subsequent presentation of card information to the card device reader and (ii) a subsequent presentation of a biometric signature to the biometric reader if said subsequently presented biometric signature matches the biometric signature at the memory location, in said local memory, defined by the subsequently presented card information.

15. A verification station for securing a process, the verification station comprising:
a card device reader for receiving card information from a card device coupled to the verification station;
a biometric signature reader for receiving a biometric signature provided to the verification station;
means for determining if the provided card information has been previously provided to the verification station;
means, if the provided card information has not been previously provided to the verification station, for:
storing the inputted biometric signature in a memory at a memory location defined by the provided card information; and
performing the process dependent upon the received card information;
means, if the provided card information has been previously provided to the verification station, for:
comparing the inputted biometric signature to the biometric signature stored in the memory at the memory location defined by the provided card information;
if the inputted biometric signature matches the stored biometric signature, performing the process dependent upon the received card information; and
if the inputted biometric signature does not match the stored biometric signature, not performing the process dependent upon the received card information.

16. A verification station according to claim 15, wherein the card device reader is one of:
a reader for a card in which the card information is encoded in a magnetic strip;
a reader for a card in which the card information is encoded in a bar code;
a reader for a smart card in which the card information is stored in a solid state memory on the smart card; and
a receiver for a key fob adapted to provide the card information by transmitting a wireless signal to the verification station.

17. A verification station according to claim 15, wherein the memory is incorporated in a tamper-proof manner in the verification station.

18. A non-transitory computer readable medium having recorded thereon a computer program for directing a processor to execute a method for securing a process at a verification station, said program comprising:

code for determining if card information, provided to a card device reader incorporated into the verification station, has been previously provided to the verification station;

code, if the provided card information has not been previously provided to the verification station, for:
  storing a biometric signature, inputted to a biometric signature reader incorporated into the verification station, in a memory incorporated into the verification station, at a memory location defined by the provided card information; and
  performing the process dependent upon the received card information;

code, if the provided card information has been previously provided to the verification station, for:
  comparing the inputted biometric signature to the biometric signature stored in the memory at the memory location defined by the provided card information;
  if the inputted biometric signature matches the stored biometric signature, performing the process dependent upon the received card information; and
  if the inputted biometric signature does not match the stored biometric signature, not performing the process dependent upon the received card information.

19. A non-transitory computer readable medium having recorded thereon a computer program for directing a processor to execute a method of enrolling in a biometric card pointer system, the program comprising:
  code for receiving card information;
  code for receiving the biometric signature;
  code for defining, dependent upon the received card information, a memory location in a local memory external to the card;
  code for determining if the defined memory location is unoccupied; and
  code for storing, if the memory location is unoccupied, the biometric signature at the defined memory location.

20. A non-transitory computer readable medium having recorded thereon a computer program for directing a processor to execute a method of obtaining verified access to a process, the program comprising:
  code for storing a biometric signature according to the enrolment method of claim 19;
  code for subsequently presenting card information and a biometric signature; and
  code for verifying the subsequently presented presentation of the card information and the biometric signature if the subsequently presented biometric signature matches the biometric signature at the memory location, in said local memory, defined by the subsequently presented card information.

* * * * *

UNITED STATES PATENT AND TRADEMARK OFFICE
CERTIFICATE OF CORRECTION

PATENT NO.       : 8,620,039 B2                              Page 1 of 1
APPLICATION NO. : 12/063650
DATED            : December 31, 2013
INVENTOR(S)      : Christopher John Burke It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1707 days.

Signed and Sealed this
Twenty-second Day of September, 2015

Michelle K. Lee
*Director of the United States Patent and Trademark Office*